US012639381B2

(12) United States Patent　　(10) Patent No.:　US 12,639,381 B2
Paris et al.　　(45) Date of Patent:　*May 26, 2026

(54) METHOD AND SYSTEM FOR INTENT-DRIVEN SEARCHING

(71) Applicant: YAHOO ASSETS LLC, Dulles, VA (US)

(72) Inventors: Jonathan Paris, Palo Alto, CA (US); Reiner Kraft, Gilroy, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 257 days.

This patent is subject to a terminal disclaimer.

(21) Appl. No.: 17/891,793

(22) Filed: Aug. 19, 2022

(65) Prior Publication Data

US 2022/0391461 A1　　Dec. 8, 2022

Related U.S. Application Data

(63) Continuation of application No. 16/389,027, filed on Apr. 19, 2019, now Pat. No. 11,423,106, which is a continuation of application No. 14/874,547, filed on Oct. 5, 2015, now Pat. No. 10,296,647.

(51) Int. Cl.
　*G06F 16/9535*　　(2019.01)
　*G06F 16/9536*　　(2019.01)
　*G06F 16/9537*　　(2019.01)
(52) U.S. Cl.
　CPC ...... *G06F 16/9535* (2019.01); *G06F 16/9536* (2019.01); *G06F 16/9537* (2019.01)

(58) Field of Classification Search
　CPC ............ G06F 16/9536; G06F 16/9535; G06F 16/9537
　See application file for complete search history.

(56) References Cited

U.S. PATENT DOCUMENTS

| | | | |
|---|---|---|---|
| 2002/0032574 A1* | 3/2002 | Lowrance | G06Q 10/06 706/14 |
| 2006/0069675 A1 | 3/2006 | Ogilvie | |
| 2006/0288015 A1 | 12/2006 | Schirripa et al. | |
| 2007/0061336 A1 | 3/2007 | Ramer et al. | |
| 2009/0119234 A1 | 5/2009 | Pinckney et al. | |
| 2010/0082593 A1 | 4/2010 | Singh | |
| 2010/0235340 A1 | 9/2010 | Todhunter et al. | |
| 2011/0191363 A1 | 8/2011 | Bell et al. | |
| 2011/0196852 A1 | 8/2011 | Srkanth et al. | |
| 2012/0323877 A1 | 12/2012 | Ray et al. | |
| 2013/0124505 A1 | 5/2013 | Bullotta et al. | |
| 2014/0058841 A1 | 2/2014 | Getchius | |
| 2014/0330769 A1 | 11/2014 | Nguyen et al. | |
| 2015/0161256 A1 | 6/2015 | Jeh | |
| 2016/0147845 A1 | 5/2016 | Gilbert et al. | |
| 2016/0321694 A1 | 11/2016 | Vorozhtsov | |
| 2017/0147680 A1 | 5/2017 | Bai et al. | |
| 2018/0096071 A1 | 4/2018 | Green | |

* cited by examiner

*Primary Examiner* — William Spieler
(74) *Attorney, Agent, or Firm* — VENABLE LLP

(57)　　ABSTRACT

The present teaching relates to searching. In one example, a search query is received from a person. A plurality of search results are retrieved based on the search query. An intent of the person is estimated with respect to at least some of the plurality of search results. The estimated intent is what the person intends to do with respect to the at least some of the plurality of search results. The plurality of search results are provided based on the estimated intent of the person.

20 Claims, 12 Drawing Sheets

402
Receive a search query from a user

404
Retrieve search results based on the query

406
Estimate an intent of the user for each search result

408
Provide the search results based on estimated intent

Determine a priority for each search result based on the estimated intent of the user w.r.t. the search result — 802

Filter the search results based on the priorities — 804

Rank the search results based on the priorities — 806

Present the filtered and ranked search results — 808

1002 Obtain context information related to the application

1004 Obtain user information

1006 Find collaborative users similar to the user

1008 Determine situations in which the search result is provided to collaborative users 1010 Estimate intent of the user w.r.t. the search result based on info. of similar collaborative users in the similar situations

METHOD AND SYSTEM FOR INTENT-DRIVEN SEARCHING

CROSS-REFERENCE TO RELATED APPLICATIONS

The present application is a continuation of U.S. patent application Ser. No. 16/389,027, filed Apr. 19, 2019, which is a continuation of U.S. patent application Ser. No. 14/874, 547, filed Oct. 5, 2015, the contents of which are hereby incorporated by reference in their entireties.

BACKGROUND

2. Technical Field

The present teaching relates to methods and systems for searching.

3. Discussion of Technical Background

A search engine is one type of information retrieval system that is designed to help users search for and obtain access to information that is stored in a computer system or across a network of computers. In response to a query from a user, a search engine can search different sources online to obtain search results matching the query. The search results are usually ranked and filtered before being provided to the user.

Existing searching techniques focus on ranking search results based on relevance between each search result and the query, and filtering the search results based on a pre-selected vertical domain. The query and the pre-selected domain may not reflect what the user is really interested in. In addition, existing works mainly focus on information about the individual user, which may not help the search result ranking or filtering if the user's available information is rare in the system.

Therefore, there is a need to provide an improved solution for searching to solve the above-mentioned problems.

SUMMARY

The present teaching relates to methods and systems for intent-driven searching.

In one example, a method, implemented on at least one computing device each having at least one processor, storage, and a communication platform connected to a network for searching is presented. A search query is received from a person. A plurality of search results are retrieved based on the search query. An intent of the person is estimated with respect to at least some of the plurality of search results. The estimated intent is what the person intends to do with respect to the at least some of the plurality of search results. The plurality of search results are provided based on the estimated intent of the person.

In a different example, a system for searching is presented. The system includes a search engine, an intent estimator, and a search result enhancer. The search engine is configured to retrieve a plurality of search results based on a search query received from a person. The intent estimator is configured to estimate an intent of the person with respect to at least some of the plurality of search results. The estimated intent is what the person intends to do with respect to the at least some of the plurality of search results. The search result enhancer is configured to provide the plurality of search results based on the estimated intent of the person.

Other concepts relate to software for implementing the present teaching on searching. A software product, in accord with this concept, includes at least one non-transitory, machine-readable medium and information carried by the medium. The information carried by the medium may be executable program code data, parameters in association with the executable program code, and/or information related to a user, a request, content, or information related to a social group, etc.

In one example, a non-transitory, machine-readable medium having information recorded thereon for searching is presented. A search query is received from a person. A plurality of search results are retrieved based on the search query. An intent of the person is estimated with respect to at least some of the plurality of search results. The estimated intent is what the person intends to do with respect to the at least some of the plurality of search results. The plurality of search results are provided based on the estimated intent of the person.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
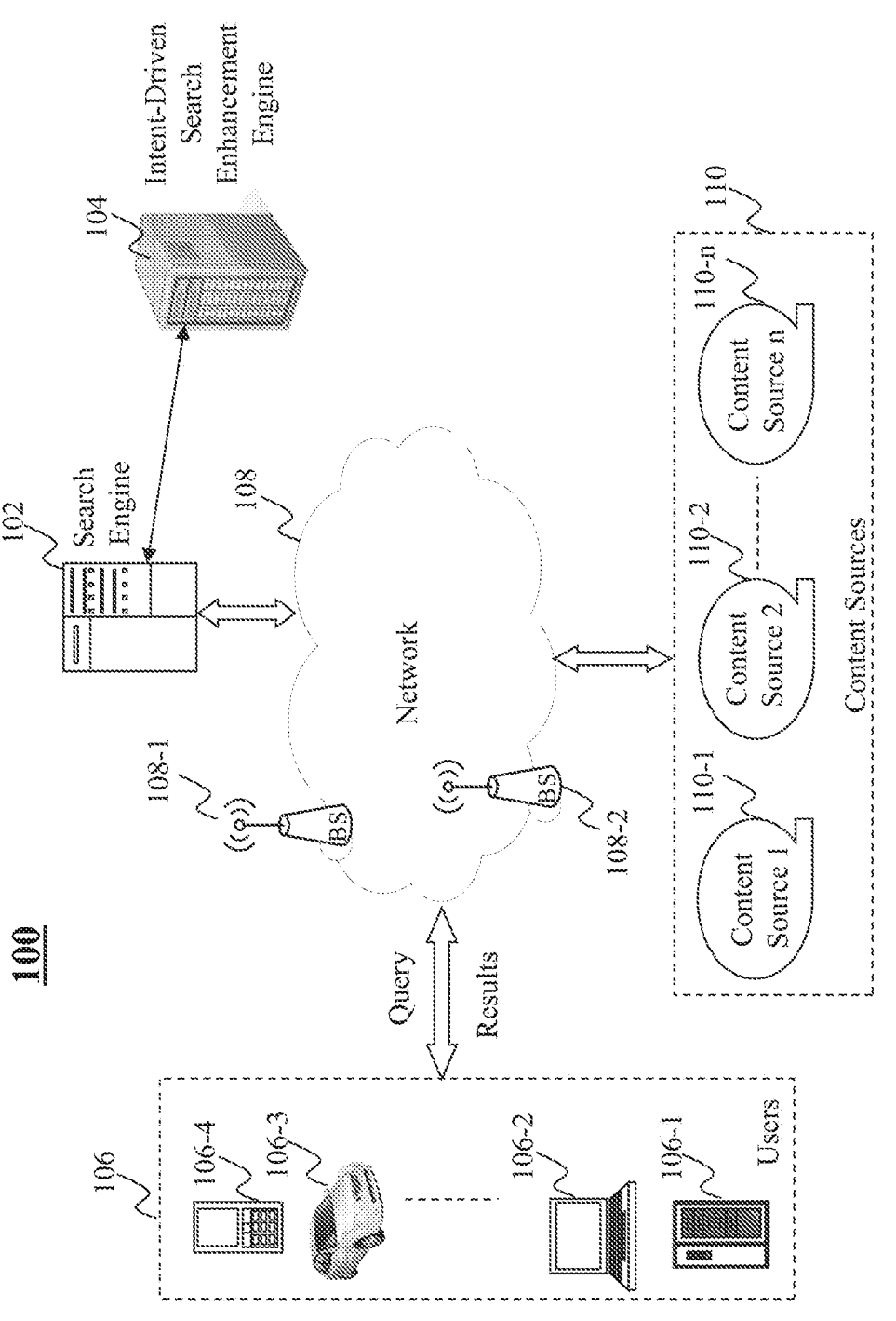
FIGS. 1-2 illustrate exemplary system configurations in which an intent-driven search enhancement engine can be deployed, according to various embodiments of the present teaching.

In the following detailed description, numerous specific details are set forth by way of examples in order to provide a thorough understanding of the relevant teachings. However, it should be apparent to those skilled in the art that the present teaching may be practiced without such details. In other instances, well-known methods, procedures, components, and/or circuitry have been described at a relatively high level, without detail, in order to avoid unnecessarily obscuring aspects of the present teaching.

The present teaching generally relates to systems, methods, medium, and other implementations directed to enhancing search results by utilizing user intent realized as a specialized and networked system by utilizing one or more computing devices (e.g., mobile phone, personal computer, etc.) and network communications (wired or wireless).

A search engine may rank and filter search results based on a variety of mechanisms including referring sites, user click data, language, and locale. The system in the present teaching may enhance a search scheme by influencing result ranking and filtering based on intents of a person submitting the query, e.g., intent to save a result or intent to share a result. These intents can indicate what the person intends to do with respect to an individual search result, such that different search results can be better distinguished for ranking or filtering based on the person's respective intents for the different search results.

Whether a search result is likely to be shared, saved, or clicked may be highly dependent on use case, e.g. a specific application with respect to which the search is performed. The method and system may estimate the person's intent based on a context in which the query is initiated. A person's intent may be different for different types of applications in which the search query is initiated, e.g. a music application vs. a social media application. A person's intent may also be different based on an environment in the application from which the search query is initiated, e.g. during the person's browsing of a news article vs. during the person's browsing of an image. In various embodiments, a person's intent may be inferred based on the application in which the user starts, the in-app context, and the application category of the application.

A search engine may have multiple users performing searches on it. Even if one user's intent cannot be determined by the user's own information or behavior, the method and system of the present teaching may utilize information of other users to estimate the user's intent. For example, the method and system can anticipate a user's intent with respect to a search result via collaborative filtering, based on other users' information with respect to the same search result. The other users' information may include actions (e.g. saving or sharing) taken by them to the search result and responses from others to an action taken by the user, e.g. after the user shared the same search result to other users in the past. The other users can be selected by the system based on a similarity between each of them and the user of interest.

As the method and system collect more and more data about the users' intents, the method and system can rank and filter search results based on their statistics related to the users' intents. For example, the system may rank a search result higher if the search result comes from a website that is more popular than other websites in terms of sharing results. The search enhancement provided by the method and system can help users to quickly find a result that they would like to save, share, or click within a particular application context.

Additional features will be set forth in part in the description which follows, and in part will become apparent to those skilled in the art upon examination of the following and the accompanying drawings or may be learned by production or operation of the examples. The features of the present teaching may be realized and attained by practice or use of various aspects of the methodologies, instrumentalities and combinations set forth in the detailed examples discussed below.

Figure 2:
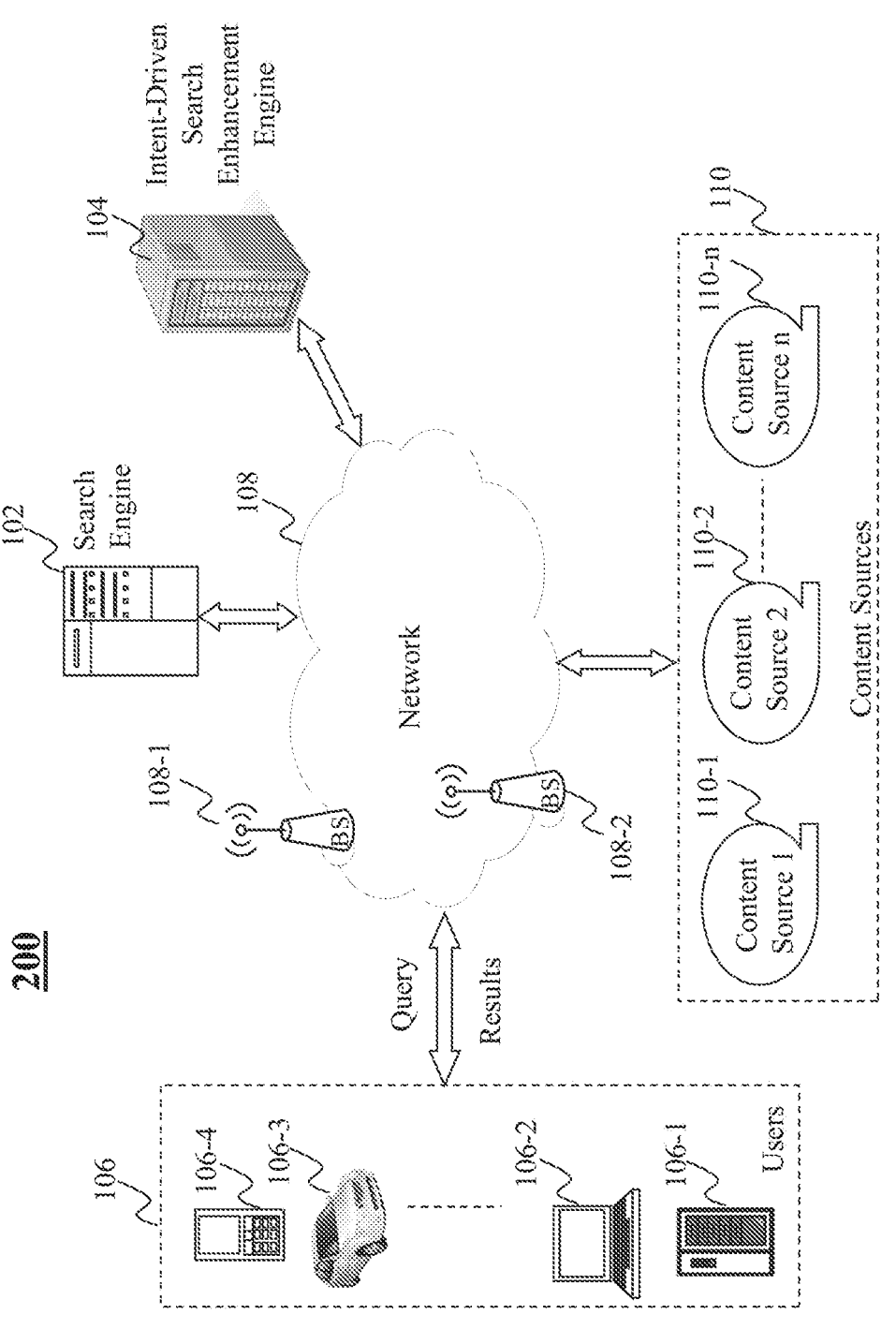

FIGS. 1-2 illustrate exemplary system configurations in which an intent-driven search enhancement engine can be deployed, according to various embodiments of the present teaching. In FIGS. 1-2, the exemplary systems include a search engine 102, an intent-driven search enhancement engine 104, users 106, a network 108, and content sources 110 including a content source 1 110-1, a content source 2 110-2, . . . , a content source n 110-n.

The network 108 may be a single network or a combination of different networks. For example, a network may be a local area network (LAN), a wide area network (WAN), a public network, a private network, a proprietary network, a Public Switched Telephone Network (PSTN), the Internet, a wireless network, a cellular network, a virtual network, or any combination thereof. A network may also include various network access points, e.g., wired or wireless access points such as base stations or Internet exchange points 108-1, . . . , 108-2, through which a data source may connect to the network 108 in order to transmit information via the network 108, and a network node may connect to the network 108 in order to receive information.

The users 106 may be of different types such as end users connected to the network 108 via desktop connections (106-1), users connecting to the network 108 via wireless connections such as through a laptop (106-2), a hand-held device (106-4), or a built-in device in a mobile vehicle such as a motor vehicle (106-3). The users 106 may be connected to the network 108 and able to communicate with the search engine 102 and the intent-driven search enhancement engine 104. A user 106 may send a search query to the search engine 102 via the network 108 and receive search results from the search engine 102. The search engine 102 may be any a web search engine that can perform general web search over the Internet or a vertical search engine that can search results in a particular content vertical. The search engine 102 may also be a specialized search engine dedicated to search information in certain data repositories, such as content of a website. The search engine 102 may also be an information retriever that can retrieve any information from a user 106's private data sources, such as emails, contact lists, calendars, and local files.

As will be described below in detail, the intent-driven search enhancement engine 104 estimates intents of a user 106 with respect to each search result retrieved by the search engine 102 and adjusts the search results based on the estimated intents. An estimated intent is for what the user 106 intends to do with respect to the search result including, for example, the intent to save the search result and intent to share the search result. The intent-driven search enhancement engine 104 may apply collaborative filtering based on information related to other users with respect to the same search result in similar situations. The information includes, for example, actions taken by other users with respect to the search result (e.g., saving or sharing with others) and responses to the actions from other users with respect to the search results (e.g., whether the other party accepts the shared search result). The situation may be determined based on search context information such as the type of application in which the search is initiated and in-app environment in which the search is initiated. Based on the estimated intents with respect to each search result, the intent-driven search enhancement engine 104 may adjust the search results by filtering and/or ranking the search results.

The content sources 110 include multiple content sources 110-1, 110-2, . . . , 110-n, such as vertical content sources. A content source 110 may correspond to a website hosted by an entity, whether an individual, a business, or an organization such as USPTO.gov, a content provider such as CNN.com and Yahoo.com, a social network website such as Facebook.com, or a content feed source such as Twitter or blogs. The search engine 102 may access information from any of the content sources 110-1, 110-2, . . . , 110-n. For example, the search engine 102 may fetch content, e.g., websites, through its web crawler to build a search index.

FIG. 1 shows a system configuration 100 in which the intent-driven search enhancement engine 104 serves as a backend sub-system of the search engine 102 for dedicatedly providing intent-driven search enhancement service to the particular search engine 102. In other words, the search engine 102 deploys a dedicated backend intent-driven search enhancement sub-system for improving user experience and user engagement.

FIG. 2 shows a slightly different system configuration 200 in which the intent-driven search enhancement engine 104 serves as an independent service provider. In this configuration 200, the intent-driven search enhancement engine 104 and search engine 102 may belong to different entities, and the intent-driven search enhancement engine 104 may independently provide service of intent-driven search enhancement to any search engine 102.

Figure 3:
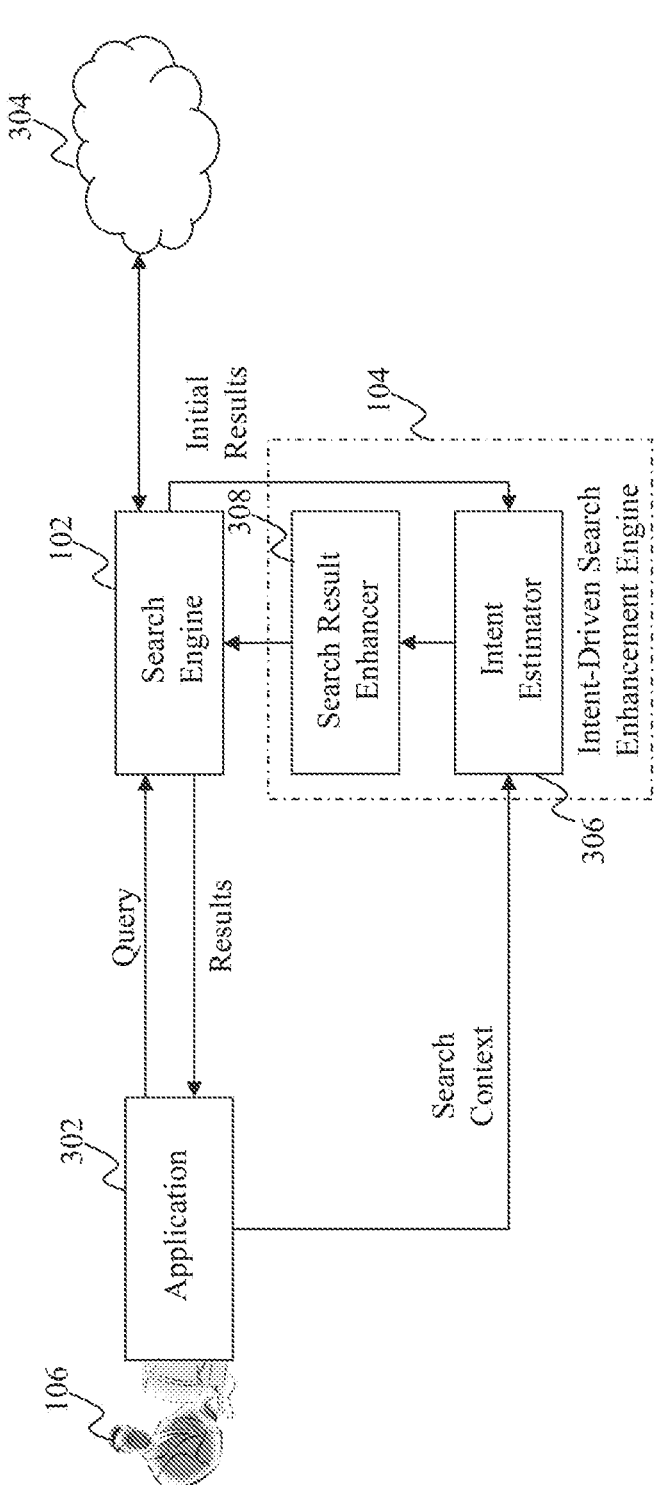
FIG. 3 depicts an exemplary diagram of a system for intent-driven searching, according to an embodiment of the present teaching.

FIG. 3 depicts an exemplary diagram of a system for intent-driven searching, according to an embodiment of the present teaching. In this embodiment, the user 106 uses an application 302 to initiate a search. The search is performed by the search engine 102 in a data space 304, including the Internet, intranets, social media sties, content sharing sites, local networks, the user 106's private data sources (e.g., email accounts and local files), etc. A search is initiated by the user 106 in the application 302 by inputting a search query in an environment of the application 302 (in-app environment). The search query is received by the search engine 102 as the basis for performing the search in the data space 304. The initial search results are provided to the intent-driven search enhancement engine 104. On the other hand, search context information including, for example, the type of the application 302 and the in-app environment, is provided by the application 302 to the intent-driven search enhancement engine 104. Any information related to the user 106 may be provided to the intent-driven search enhancement engine 104 as well. The intent-driven search enhancement engine 104 then estimates an intent of the user 106 with respect to at least one of the initial search results (e.g., intent to save the search result and intent to share the search result with others). The estimation may be made via collaborative filtering based on the search context and/or information related to the user 106. The estimated intent(s) are used to enhance the initial search results by filtering and/or ranking the results. The enhanced search results are provide by the intent-driven search enhancement engine 104 to the search engine 102 and returned to the user 106 by the search engine 102.

The application 302 may be any suitable application pre-installed on the user 106's device, such as a web browser, an email client application, etc., any third party application installed by the user 106 such as a social media client application, a travel agent application, etc., or any cloud-based application installed on a remote server with an interface on the user's 106 device. Although only one application 302 is shown in FIG. 3, it is understood that in other examples, the user 106 may perform searches via multiple applications if desired. The user 106 in this embodiment interacts with the application 302 to complete one or more tasks, for example, composing and sending emails through an email client application, planning trips through a travel agent application, and updating social media account through a social media application. Each application 302 belongs to a particular type of applications, such as the category in Apple's App Store, Google Play, etc. Application types include books, business, catalogs, education, entertainment, finance, food & drink, games, health & fitness, kids, lifestyle, medical, music, navigation, news, utilities, travel, sports, references, social networking, weather, photo & video, etc. It is possible that an application 302 has more than one type. In any event, the user 106 can initiate a search in the application 302. A search may be initiated in a particular environment in the application 302 (in-app environment). For example, in a social networking application, the search may be initiated in a general environment for searching any information in the social media site, in a connection/friend/follower environment for searching a person, in a message environment for searching previous messages, etc. The type(s) of an application 302 and the in-app environment are parts of the search context information.

The intent-driven search enhancement engine 104 in this embodiment includes an intent estimator 306 and a search result enhancer 308. The intent estimator 306 receives the initial set of search results from the search engine 102 and search context information from the application 302. For at least one of the initial search results, the intent estimator 306 estimates the user 106's intent with respect to the result, for example, whether the user 106 intends to save the search result or share the search result with others. Any other types of intent, which are indicative of the level of interest or engagement for the user 106 with respect to the search result, may be estimated by the intent estimator 306 as well, such as intent to click. In some examples, one particular type of intent may be estimated with respect to a search result, while in other examples, multiple types of intent may be estimated with respect to the search result. In this embodiment, the estimation is performed by the intent estimator 306 via collaborative filtering based on known intents of other users with respect to the same search result in similar situations. The similarity of situations may be determined based on the search context information, for example, whether the other users searched and obtained the same search result using the same type of application 302 and/or in the same in-app environment. It is understood that the estimation of user intent with respect to a particular search result may rely on availabilities of data regarding what other users have done before with respect to the same search result. Thus, when the data is not available or not sufficient, for some initial search results, the intent estimator 306 may not be able to estimate their user intents.

Based on the estimated intent(s) with respect to some or all of the initial search results provided by the intent estimator 306, the search result enhancer 308 in this embodiment adjusts the initial search results to improve user experience and user engagement. The search result enhancer 308 may rank the initial search results based on the estimated intent(s), for example, by ranking the search results with stronger user intent to save and/or user intents to share higher. The search result enhancer 308 may filter out some initial search results that have low or no estimated intent to save and/or intent to share. If more than one type of user intent is estimated by the intent estimator 306, then the search result enhancer 308 may apply any suitable model to combine the multiple types of user intent in determining the priorities of the search results.

Figure 4:
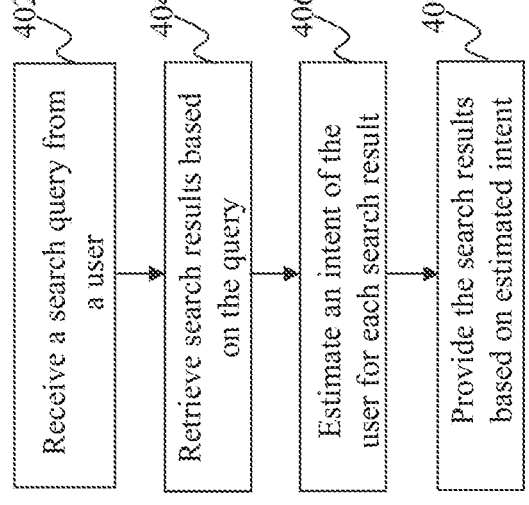
FIG. 4 depicts a flowchart of an exemplary process for intent-driven searching, according to an embodiment of the present teaching.

FIG. 4 depicts a flowchart of an exemplary process for intent-driven searching, according to an embodiment of the present teaching. Starting at 402, a search query is received from a user. The search query may be initiated in an environment of a particular type of application, such as in searching email attachments within an email client application. At 404, search results are retrieved based on the search query. The search results may be retrieved from any data space, including a public space such as the Internet, a semi-private space such as social media sites and content sharing sites, and a private space such as emails, contact lists, calendars, etc. An intent of the user with respect to each of the search results is estimated at 406. For some search results, the intents cannot be estimated, and thus are returned as null. The intent estimation may be performed via collaborative filtering based on information related to others with respect to the same search result. At 408, the search results are provided based on their estimated intents. The search results may be adjusted by filtering out some results and/or ranking them according to their estimated intents.

Figure 5:
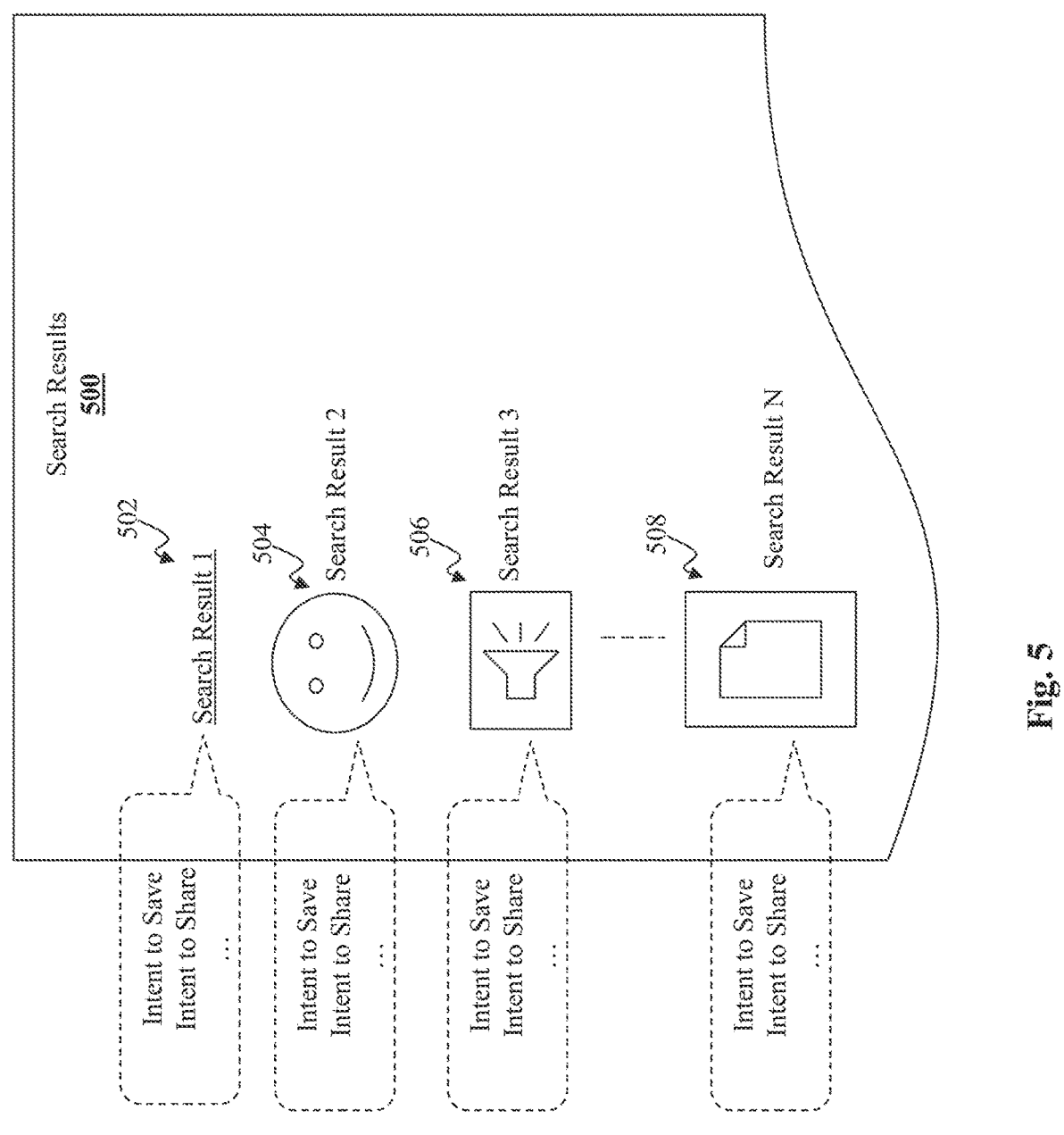
FIG. 5 illustrates one example of a search results page having multiple search results, each of which is associated with a variety of user intents, according to an embodiment of the present teaching.

FIG. 5 illustrates one example of a search results page having multiple search results, each of which is associated with a variety of user intents, according to an embodiment of the present teaching. In this example, the search results page 500 includes a list of search results 502, 504, 506, 508, which are in various forms. In this example, search result 1 502 is a hyperlink, search result 2 504 is an image, search result 3 506 is an audio file, and search result 4 508 is a document. Regardless of the specific form, each search result may be associated with one or more user intents as to what the user wants to do with respect to the search result when the search result is provided to the user. The intent may be indicative of the user's level of interest or engagement with respect to a search result. The intent may be an intent to save the search result (e.g., saving a hyperlink, saving a webpage or a website, saving an image, saving an audio file, saving a document, etc.). The intent may also be an intent to share the search result with others. For example, the user may intend to share the hyperlink, webpage, website, image, audio file, or document to connections in any social media site, such as Facebook, Twitter, LinkedIn, Tumblr, etc. The user may also intend to share the hyperlink, webpage, website, image, audio file, or document on a content sharing sties with other users with an access permission. The user may further intend to send the hyperlink, webpage, website, image, audio file, or document to any other users via means such as emails, instant messaging, text messages, and so on. It is understood that other intents may be associated with each search result, like intent to click, open, dwell, or scroll through the search result. The intents associated with each search result are specific to a user in a particular situation (context). That is, for the same search result, different users may have different intents. Or, even for the same user, she/he may have different intents with respect to the same search result in different situations. For example, for the same Word document, it is more likely that a user intends to share it with others when the user searches it in an email application and finds it as an email attachment than when the user finds the Word document through a general web search using a web browser.

Figure 6:
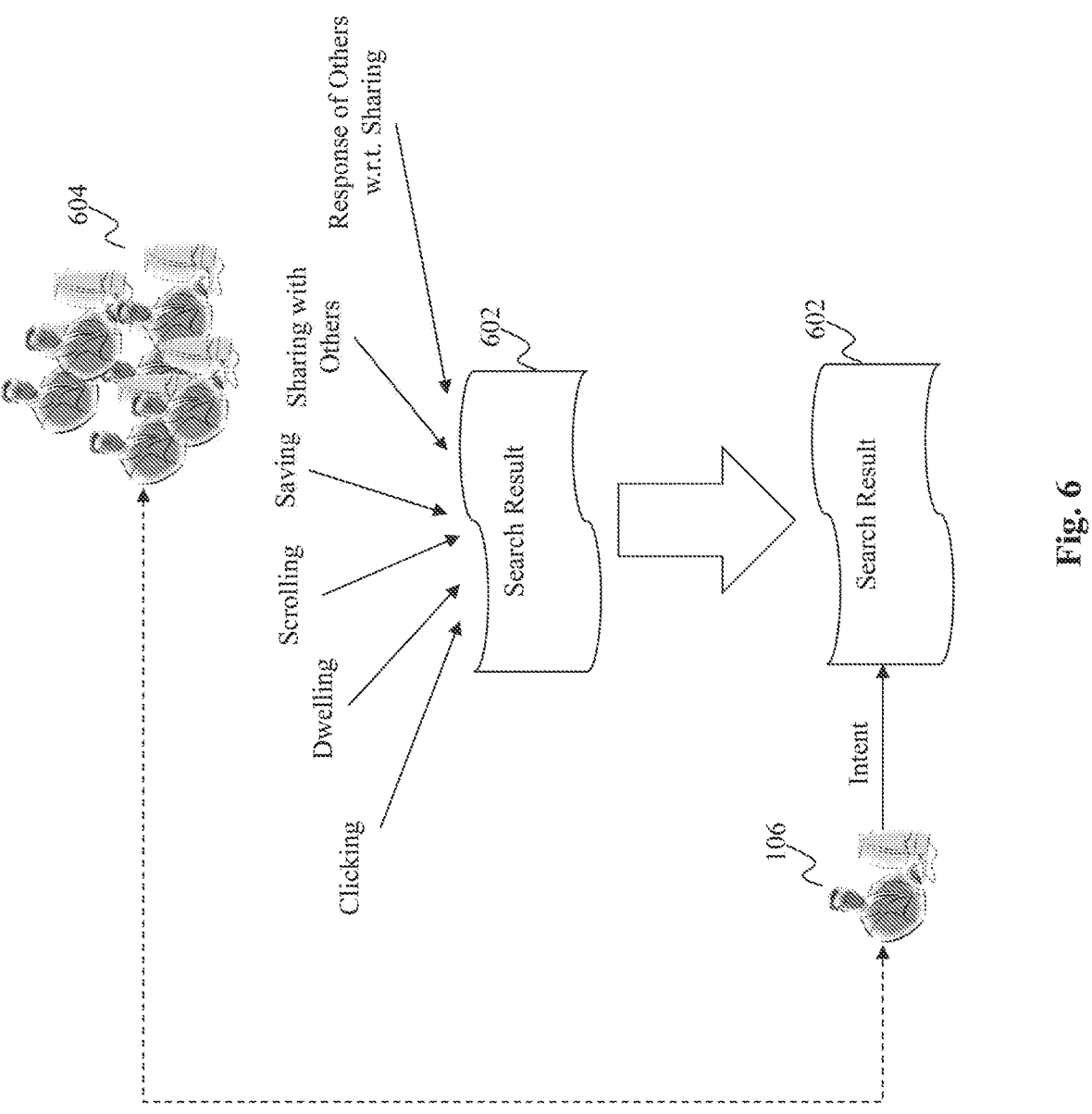
FIG. 6 depicts an exemplary scheme of estimating a user intent with respect to a search result using collaborative filtering, according to an embodiment of the present teaching.

FIG. 6 depicts an exemplary scheme of estimating a user intent with respect to a search result using collaborative filtering, according to an embodiment of the present teaching. In this embodiment, a user 106's intent with respect to a search result 602 in a situation is estimated via collaborative filtering based on information related to other users (collaborative users) 604 with respect to the same search result 602 in the similar situations. The information related to the collaborative users 604 includes actions taken by the collaborative users 604 with respect to the search result 602, such as clicking, dwelling, scrolling, saving, and sharing with others. That is, any user engagement measures such as click rate, dwell time, streaming depth, saving rate, and sharing rate may be considered here. It is understood that depending on the form of the search result 602, some actions or user engagement measures may not be appropriate. On the other hand, depending on the specific form of the search result 602, some actions or user engagement measures may have more weights than other actions or user engagement measures. In addition to actions, other parties' responses to sharing may be part of the information used by collaborative filtering as well. For example, when a collaborative user 604 shares the search result 602 to another party, what the other party does may also be counted (e.g., whether the other party accepts the shared search result 602, or whether the other party opens, saves, or shares the shared search result 602 again). In one embodiment, the information related to the collaborative users 604 may be collected in a predefined time period. In another embodiment, the information related to the collaborative users 604 may be collected in a continuous manner.

In collecting the information related to the collaborative users 604 with respect to the search result 602, the situations (contexts) in which the search result 602 are provided to the collaborative users 604 are also recorded. For example, a collaborative user 604 may be presented with the search result 602 when she/he searched email attachments. In another example, another collaborative user 604 may be provided with the search result 602 when she/he was doing a general web search using a web browser. As mentioned above, the search context information may include the type of the application by which the search is initiated and the in-app environment for initiating the search. In some embodiments, the search context information may further include the date/time and locale of search, and any information related to the user who initiates the search. In performing collaborative filtering, the situation in which the search result 602 is to be provided to the user 106 is compared with the situations in which the same search result 602 have been provided to the collaborative users 604. Once the similar situations are identified, then information related to the collaborative users 604 with respect to the search result 602 in these situations are used to estimate the intent of the user 106 with respect to the search result 602. For example, a user 106 may start to search email attachments in an email application using a certain query, and a search result 602 is to be provided to the user 106. In order to estimate the user 106's intent to share the search result 602 with others, any other collaborative users 604 who have also searched email attachments in an email application (could be the same email application or different applications as long as they all belong to the same category as email applications) and have been provided with the same search result 602 are identified. Then the identified collaborative users 604's sharing rate with respect to the search result 602 is used as a factor to estimate the user 106's intent to share the search result 602.

Figure 7:
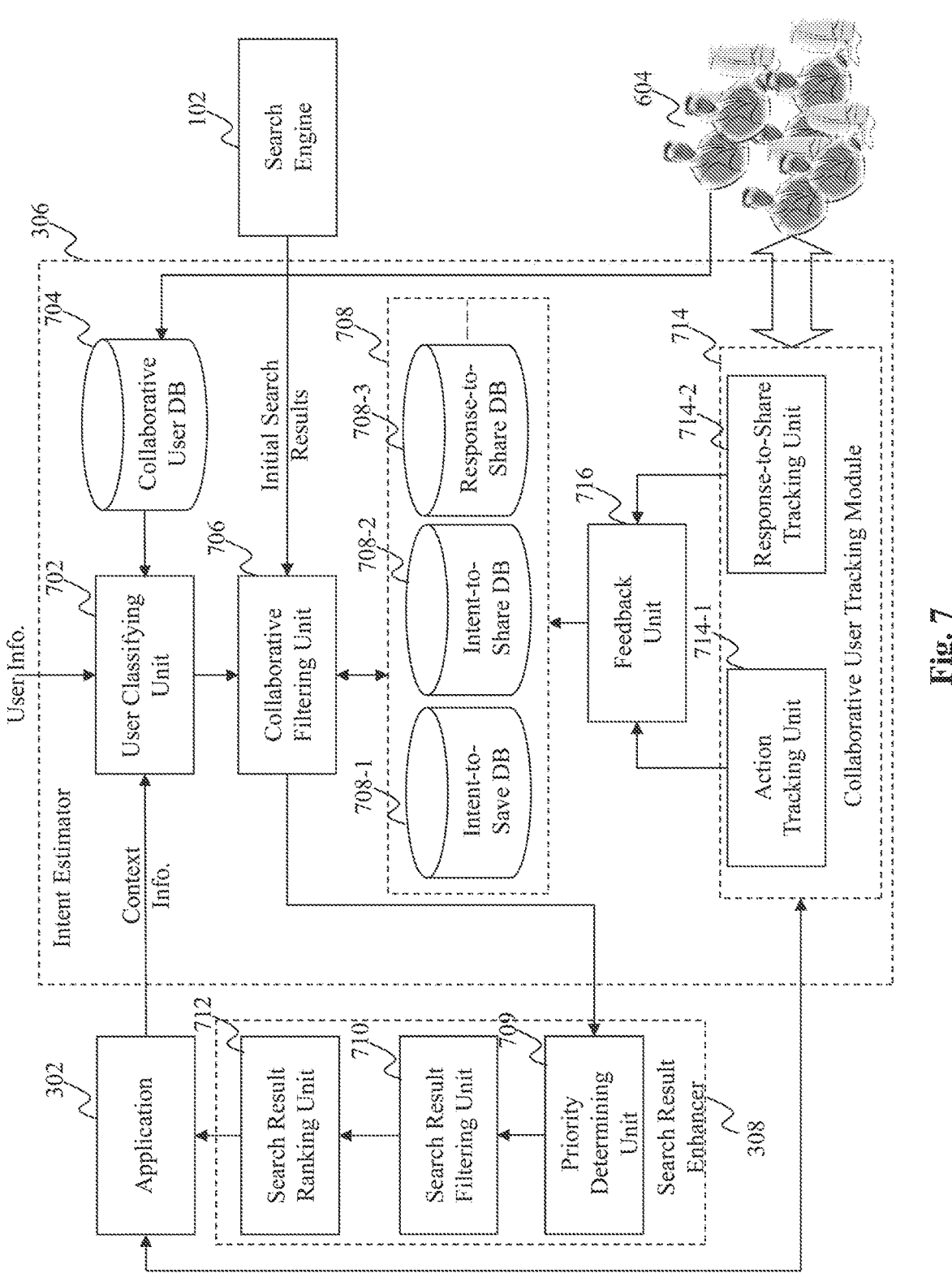
FIG. 7 depicts an exemplary system diagram of an intent-driven search enhancement engine, according to an embodiment of the present teaching.

FIG. 7 depicts an exemplary system diagram of an intent-driven search enhancement engine, according to an embodiment of the present teaching. The intent driven search enhancement engine 104 includes the intent estimator 306 for estimating an intent of a user 106 with respect to at least some of the search results provided by the search engine 102 in response to a search query initiated in the application 302. The estimated intent is for what the user 106 intends to do with respect to a search result. The intent-driven search enhancement engine 104 also includes a search result enhancer 308 configured to provide the search results based on the estimated intents of the user 106. The intent estimator 306 in this embodiment includes a user classifying unit 702, a collaborative filtering unit 706, a feedback unit 716, and a collaborative user tracking module 714. The search result enhancer 308 in this embodiment includes a priority determining unit 709, a search result filtering unit 710, and a search result ranking unit 712.

In this embodiment, the collaborative user tracking module 714 in conjunction with the feedback unit 716 builds multiple intent databases 708 based on information related to the collaborative users 604 with respect to a number of search results. The collaborative user tracking module 714 includes an action tracking unit 714-1 and a response-to-share tracking unit 714-2. The action tracking unit 714-1 tracks any user actions and corresponding user engagement measures with respect to existing search results that have been provided to the collaborative users 604 before. The response-to-share tracking unit 714-2 tracks any responses from other users when receiving any search result shared by a collaborative user 604. The exemplary actions and responses are described above with respect to FIG. 6. In addition, the collaborative user tracking module 714 may also record the situations (contexts) in which the actions and/or responses occur, such as the type of application in which the search is initiated and the in-app environment. All the information tracked by the collaborative user tracking module 714 is sent to the feedback unit 716, which builds and updates the intent databases 708.

In this embodiment, each intent database 708 stores information related to a particular type of known intent of the collaborative users 604 with respect to existing search results. For example, the intent-to-save database 708-1 stores information related to actions of saving any existing search result by the collaborative users 604; the intent-to-share database 708-2 stores information related to actions of sharing any existing search result with others by the collaborative users 604; the response-to-share database stores information related to response from others when receiving any existing search results shared by the collaborative users 604. It is understood that additional intent databases may be included to store other types of intent-related information. In additional, information about the situations (contexts) in which the actions and/or responses occur, such as the type of application in which the search is initiated and the in-app environment, is also stored in the corresponding intent database 708. In this embodiment, information in the different intent databases 708 may be indexed based on the existing search results. That is, when querying a particular search result in the intent databases 708, any information related to the search result can be returned from different intent databases 708, such as the saving rate, sharing rate, or response-to-share rate among the collaborative users 604 with respect to the search result and the situations in which the information is obtained.

At runtime, when a search request is initiated by a user 106 via the application 302, the search query is sent to the search engine 102 for returning a list of initial search results. In parallel, the user classifying unit 702 receives the search context information from the application 302 and user-related information from any suitable sources. As mentioned before, the search context information includes the type of the application 302 and the in-app environment in which the search is initiated. Optionally or additionally, the search context information may include the date/time and locale of the search and information related to the user device (e.g., type, brand, and specification). The user-related information may include, for example, demographic information, declared or inferred interests and preferences, user history, and so on. User history may include the user's search history, browsing history, search result-saving history, and search result-sharing history. The user-related information for each of the collaborative users 604 is also collected and stored in a collaborative user database 704. In this embodiment, the user classifying unit 702 may compare information related to the user 106 with information related to the collaborative users 604 to find some of the collaborative users 604 who are similar to the user 106. For example, the user 106 may be classified into a subset of the collaborative users 604 as some of their user-related information are similar to each other. In some embodiments, collaborative users 604 similar to the user 106 may not be identified by the user classifying unit 702. Instead, the collaborative filtering may be performed by the collaborative filtering unit 706 based on the search context information alone.

In this embodiment, the collaborative filtering unit 706 receives a set of initial search results from the search engine 102 and performs collaborative filtering for each initial search result based on the information from the intent databases 708 with respect to the same search result as well as the information from the user classifying unit 702. In this embodiment, information related to the user 106 (information related to the similar collaborative users 604 if they have already been identified by the user classifying unit 702) and the search context information are provided to the collaborative filtering unit 706. For each search result, the collaborative filtering unit 706 identifies the current situation in which the search is initiated by the user 106 based on the search context information and/or user-related information. The information related to the same search result (e.g., saving rate, sharing rate, and response-to-share rate) is retrieved from the intent databases 708. Information that was obtained in situations similar to the current situation is used as a basis for estimating the intent of the user 106 with respect to the search result. Two situations may be similar to each other if the users are similar, the user search histories are similar, the types of applications initiating the searches are similar, and/or the in-app environments are similar. If any search result in the initial set does not have corresponding information stored in the intent databases 708 (e.g., a newly created document that has not appeared before as a search result to any collaborative user 604), then a null value may be returned by the collaborative filtering unit 706 for this search result.

Once the intents of the user 106 with respect to each initial search result are estimated, they are provided to the search result enhancer 308 as a basis for adjusting the search results before they are provided to the user 106. Priorities are determined for each initial search result based on their estimated intents by the priority determining unit 709. The search result filtering unit 710 may filter out certain search results with low priorities (e.g., without a valid estimated intent or a weak intent below a threshold) to reduce the number of search results to be presented to the user 106. The search result ranking unit 712 may rank the search results based on their priorities. The adjusted search results are then provided to the application 302.

Figure 8:
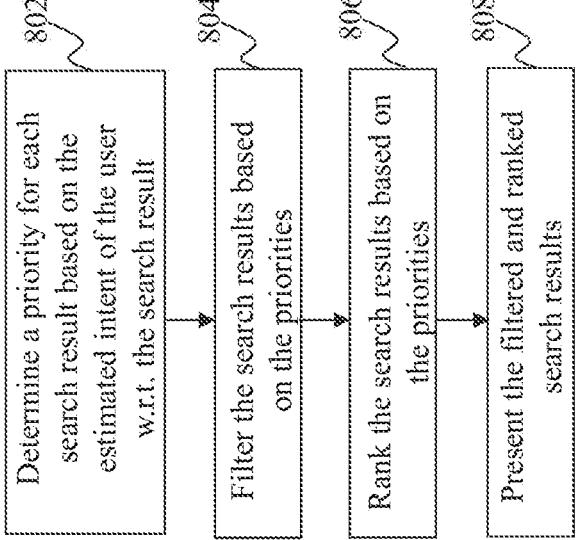
FIG. 8 is a flowchart of an exemplary process for a search result enhancer, according to an embodiment of the present teaching.

FIG. 8 is a flowchart of an exemplary process for a search result enhancer, according to an embodiment of the present teaching. Starting at 802, a priority for each search result is determined based on the estimated intent of a user with respect to the search result. At 804, the search results are filtered based on the priorities. The search results are ranked based on the priorities at 806. At 808, the filtered and/or the ranked search results are presented to the user.

Figure 9:
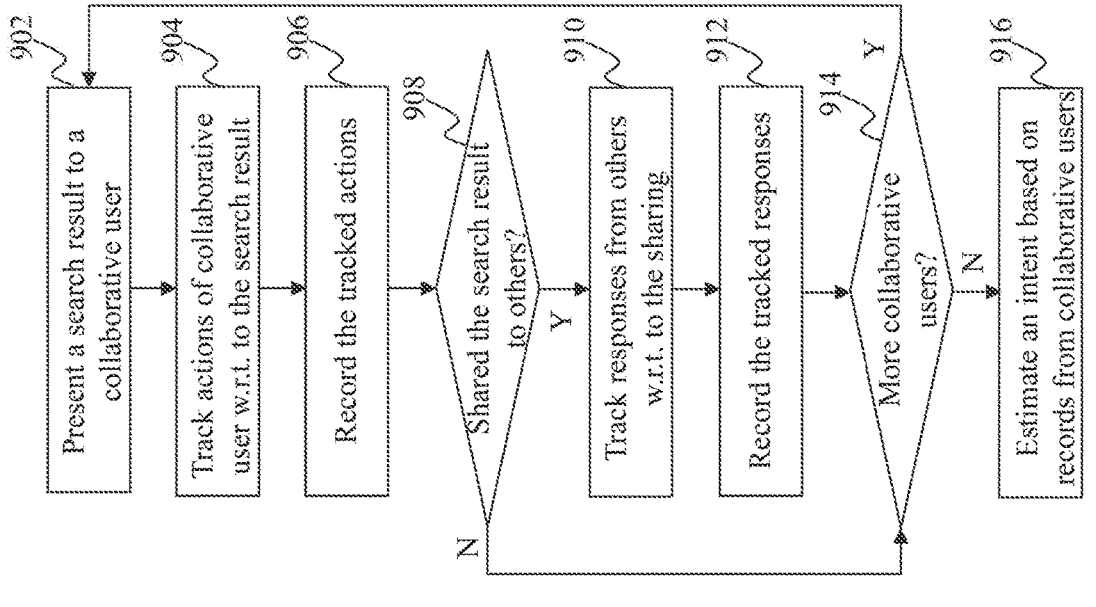
FIG. 9 is a flowchart of an exemplary process for an intent estimator, according to an embodiment of the present teaching.

FIG. 9 is a flowchart of an exemplary process for an intent estimator, according to an embodiment of the present teaching. Starting at 902, a search result is presented to a collaborative user. At 904, actions of the collaborative user with respect to the search result are tracked. The tracked actions are recorded at 906. At 908, whether the collaborative user shares the search result to others is determined. If the determination is affirmative, then at 910, responses from others with respect to the sharing are tracked. The tracked responses are recorded at 912. If the determination is negative, the process goes to 914 directly, where whether more collaborative users are presented with the same search result is determined. If the determination at 914 is positive, the process returns to 902 and is repeated. At 916, an intent with any user with respect to the same search result is estimated based on the records of the collaborative users.

Figure 10:
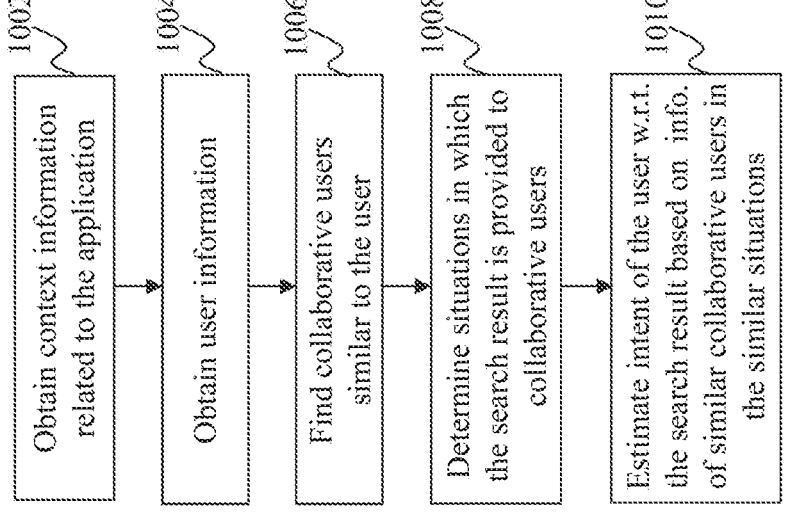
FIG. 10 is a flowchart of an exemplary process for collaborative filtering, according to an embodiment of the present teaching.

FIG. 10 is a flowchart of an exemplary process for collaborative filtering, according to an embodiment of the present teaching. Starting at 1002, search context information related to an application initiating the search is obtained. User-related information is obtained at 1004. Collaborative users who are similar to the user at issue are found based on the user-related information at 1006. At 1008, situations in which a search result is provided to the collaborative users are determined based on the search context information. At 1010, the intent of the user with respect to the same search result is estimated based on information of the similar collaborative users with respect to the search result in the similar situations. The information may include actions performed by the collaborative users with respect to the search result (e.g., saving, sharing, clicking, etc.) and responses from others with respect to sharing.

Figure 11:
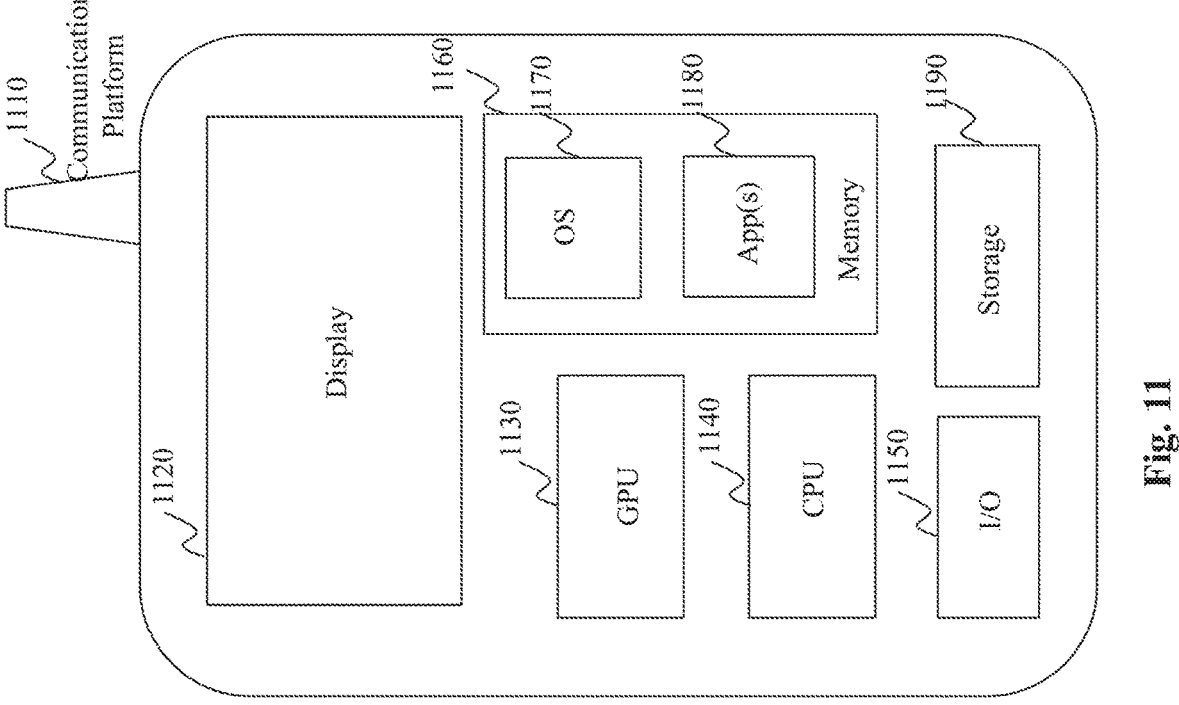
FIG. 11 depicts the architecture of a mobile device which can be used to implement a specialized system incorporating the present teaching.

FIG. 11 depicts the architecture of a mobile device which can be used to realize a specialized system implementing the present teaching. In this example, the user device on which search results are presented and interacted-with is a mobile device 1100, including, but is not limited to, a smart phone, a tablet, a music player, a hand-held gaming console, a global positioning system (GPS) receiver, and a wearable computing device (e.g., eyeglasses, wrist watch, etc.), or in any other form. The mobile device 1100 in this example includes one or more central processing units (CPUs) 1140, one or more graphic processing units (GPUs) 1130, a display 1120, a memory 1160, a communication platform 1110, such as a wireless communication module, storage 1190, and one or more input/output (I/O) devices 1150. Any other suitable component, including but not limited to a system bus or a controller (not shown), may also be included in the mobile device 1100. As shown in FIG. 11, a mobile operating system 1170, e.g., iOS, Android, Windows Phone, etc., and one or more applications 1180 may be loaded into the memory 1160 from the storage 1190 in order to be executed by the CPU 1140. The applications 1180 may include a browser or any other suitable mobile apps for receiving and rendering search results on the mobile device 1100. User interactions with the search results may be achieved via the I/O devices 1150 and provided to the intent-driven search enhancement engine 104 and/or other components of systems 100 and 200, e.g., via the network 108.

To implement various modules, units, and their functionalities described in the present teaching, computer hardware platforms may be used as the hardware platform(s) for one or more of the elements described herein (e.g., the intent-driven search enhancement engine 104 and/or other components of systems 100 and 200 described with respect to FIGS. 1-10). The hardware elements, operating systems and programming languages of such computers are conventional in nature, and it is presumed that those skilled in the art are adequately familiar therewith to adapt those technologies to enhance search results based on intent as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 12:
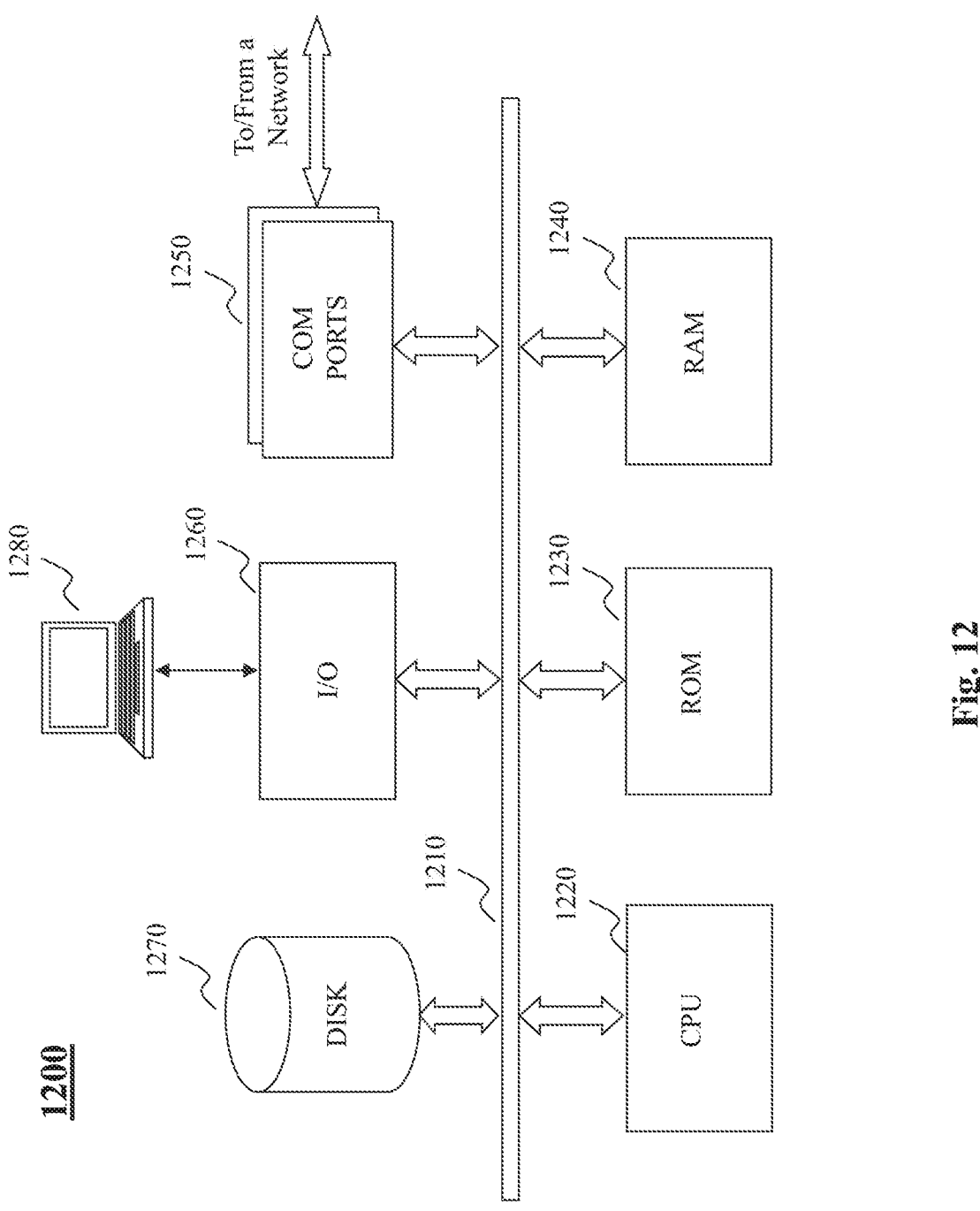
FIG. 12 depicts the architecture of a computer which can be used to implement a specialized system incorporating the present teaching.

FIG. 12 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1200 may be used to implement any component of the intent-driven search enhancement techniques, as described herein. For example, the intent-driven search enhancement engine 104, etc., may be implemented on a computer such as computer 1200, via its hardware, software program, firmware, or a combination thereof. Although only one such computer is shown, for convenience, the computer functions relating to intent-driven search enhancement as described herein may be implemented in a distributed fashion on a number of similar platforms, to distribute the processing load.

The computer 1200, for example, includes COM ports 1250 connected to and from a network connected thereto to facilitate data communications. The computer 1200 also includes a central processing unit (CPU) 1220, in the form of one or more processors, for executing program instructions. The exemplary computer platform includes an internal communication bus 1210, program storage and data storage of different forms, e.g., disk 1270, read only memory (ROM) 1230, or random access memory (RAM) 1240, for various data files to be processed and/or communicated by the computer, as well as possibly program instructions to be executed by the CPU. The computer 1200 also includes an I/O component 1260, supporting input/output flows between the computer and other components therein such as user interface elements 1280. The computer 1200 may also receive programming and data via network communications.

Hence, aspects of the methods of intent-driven search enhancement, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other enhanced ad server into the hardware platform(s) of a computing environment or other system implementing a computing environment or similar functionalities in connection with intent-driven search enhancement. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teaching is amenable to a variety of modifications and/or enhancements. For example, although the implementation of various components described above may be embodied in a hardware device, it may also be implemented as a software only solution—e.g., an installation on an existing server. In addition, the intent-driven search enhancement as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teaching.

We claim:

1. A method, implemented on a computing device having at least one processor, storage, and a communication platform capable of connecting to a network for providing enhanced search results, the method comprising:
   determining, by a search engine, a first set of search results in response to a first search issued by a first user in a first application, wherein the first application is of an application environment;
   providing, by the search engine, the first set of search results to the first application;
   presenting, via the first application, the first set of search results to the first user;
   tracking, within the first application, actions of the first user with respect to a first search result of the first set of search results;
   initiating a second search issued by a second user in a second application, wherein the second application is of the application environment;
   estimating, by the search engine and based on the tracked actions of the first user, which of a plurality of pre-defined intents that the second user has for the first search result;
   modifying, by the search engine and based on the estimating, initial web-based search results for the second search to create enhanced web-based search results;
   providing, by the search engine, the enhanced web-based search results to the second application; and
   presenting, via the second application, the enhanced web-based search results to the second user.

2. The method of claim 1, wherein the estimating which of the plurality of pre-defined intents that the second user has for the first search result is indicative of the second user's level of interest or engagement with respect to the first search result.

3. The method of claim 1, wherein the plurality of pre-defined intents comprise:
   an intent to save a search result;
   an intent to share the search result; and
   an intent to click the search result.

4. The method of claim 1, wherein the actions of the first user comprise one or more of clicking, dwelling, scrolling, saving, and sharing.

5. The method of claim 1, further comprising:
   assigning a respective weight to each of the actions of the first user, wherein the estimating is based on the weights of the actions of the first user.

6. The method of claim 1, wherein the first user is determined based on a similarity to the second user.

7. The method of claim 1, wherein the estimating is further based on one or more responses from a third user to one or more of actions of the first user.

8. A system for providing enhanced search results, comprising:
   memory storing computer program instructions; and
   one or more processors that, in response to executing the computer program instructions, effectuate operations comprising:
      determining, by a search engine, a first set of search results in response to a first search issued by a first user in a first application, wherein the first application is of an application environment;
      providing, by the search engine, the first set of search results to the first application;

presenting, via the first application, the first set of search results to the first user;

tracking, within the first application, actions of the first user with respect to a first search result of the first set of search results;

initiating a second search issued by a second user in a second application, wherein the second application is of the application environment;

estimating, by the search engine and based on the tracked actions of the first user, which of a plurality of pre-defined intents that the second user has for the first search result;

modifying, by the search engine and based on the estimating, initial web-based search results for the second search to create enhanced web-based search results;

providing, by the search engine, the enhanced web-based search results to the second application; and presenting, via the second application, the enhanced web-based search results to the second user.

9. The system of claim 8, wherein the estimating which of the plurality of pre-defined intents that the second user has for the first search result is indicative of the second user's level of interest or engagement with respect to the first search result.

10. The system of claim 8, wherein the plurality of pre-defined intents comprise:

an intent to save a search result;

an intent to share the search result; and an intent to click the search result.

11. The system of claim 8, wherein the actions of the first user comprise one or more of clicking, dwelling, scrolling, saving, and sharing.

12. The system of claim 8, wherein the operations further comprise:

assigning a respective weight to each of the actions of the first user, wherein the estimating is based on the weights of the actions of the first user.

13. The system of claim 8, wherein the first user is determined based on a similarity to the second user.

14. The system of claim 8, wherein the estimating is further based on one or more responses from a third user to one or more of actions of the first user.

15. A non-transitory, machine-readable medium having information recorded thereon for providing enhanced search results, wherein the information, when read by a machine, effectuate operations comprising:

determining, by a search engine, a first set of search results in response to a first search issued by a first user in a first application, wherein the first application is of an application environment;

providing, by the search engine, the first set of search results to the first application;

presenting, via the first application, the first set of search results to the first user;

tracking, within the first application, actions of the first user with respect to a first search result of the first set of search results;

initiating a second search issued by a second user in a second application, wherein the second application is of the application environment;

estimating, by the search engine and based on the tracked actions of the first user, which of a plurality of pre-defined intents that the second user has for the first search result;

modifying, by the search engine and based on the estimating, initial web-based search results for the second search to create enhanced web-based search results;

providing, by the search engine, the enhanced web-based search results to the second application; and presenting, via the second application, the enhanced web-based search results to the second user.

16. The medium of claim 15, wherein the estimating which of the plurality of pre-defined intents that the second user has for the first search result is indicative of the second user's level of interest or engagement with respect to the first search result.

17. The medium of claim 15, wherein the plurality of pre-defined intents comprise:

an intent to save a search result;

an intent to share the search result; and an intent to click the search result.

18. The medium of claim 15, wherein the actions of the first user comprise one or more of clicking, dwelling, scrolling, saving, and sharing.

19. The medium of claim 15, wherein the operations further comprise:

assigning a respective weight to each of the actions of the first user, wherein the estimating is based on the weights of the actions of the first user.

20. The medium of claim 15, wherein the first user is determined based on a similarity to the second user.

* * * * *